Sept. 1, 1925
D. B. C. FERGUSON
CHERRY PITTER
Filed Oct. 23, 1924
1,551,815
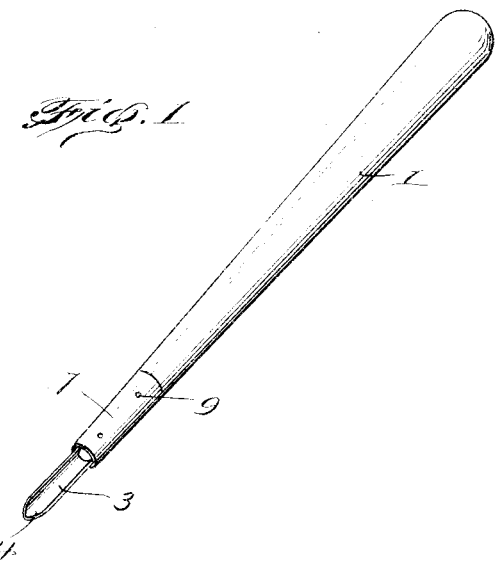
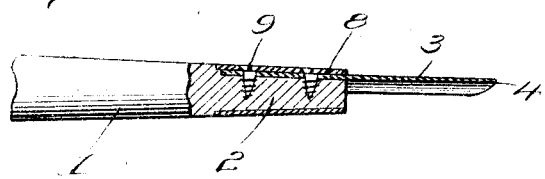
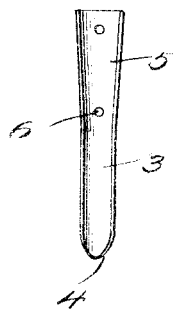
Inventor
David B.C. Ferguson.
By Clarence A. O'Brien
Attorney Patented Sept. 1, 1925.

1,551,815

UNITED STATES PATENT OFFICE.

DAVID B. C. FERGUSON, OF BROADALBIN, NEW YORK.

CHERRY PITTER.

Application filed October 23, 1924. Serial No. 745,427.

*To all whom it may concern:*

Be it known that I, DAVID B. C. FERGUSON, a citizen of the United States, residing at Broadalbin, in the county of Fulton and State of New York, have invented certain new and useful Improvements in a Cherry Pitter, of which the following is a specification.

This invention relates to new and useful improvements in cherry pitters and has for its principal object to provide a simple and efficient device for removing the pits from cherries without crushing or bruising the cherries prior to the canning of the same.

A further object of the invention is to provide a cherry pitter of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

Figure 1 is a perspective view of my improved cherry pitter.

Figure 2 is a sectional view of the pitter showing the manner in which the same is secured in position on the reduced end of the handle, and the ferrule associated therewith, and Figure 3 is a detail view of the pitter.

In the drawing wherein for the purpose of illustration is shown the preferred embodiment of my invention, the numeral 1 designates the handle and the same tapers gradually toward the smaller end thereof in the manner clearly illustrated, the smaller end of the handle being reduced as indicated at 2. The pitter comprises a metallic strip which is arcuate in cross section and one end thereof is provided with a point such as is illustrated at 4 whereby the pitter 3 may be inserted into the fruit for removing the pit therefrom.

The rear portion of the pitter 3 increases gradually in width from the intermediate portion of the pitter to the rear end thereof in the manner clearly illustrated at 5, with reference more particularly to Figure 3 of the drawing. The rear portion 5 of the pitter is adapted to fit over the reduced end 2 of the handle 1 and is provided with openings 6 which are arranged in spaced relation with respect to each other.

A ferrule 7 fits over the reduced end of the handle and is also provided with openings 8 therein which are adapted to register with the openings 6 in the rear portion 5 of the pitter 3 and the purpose of this construction is to provide a means whereby any suitable fastening elements such as the screws illustrated at 9 in the drawing may pass through the registering openings in the ferrule and pitter respectively for securing the same in position on the reduced portion 2 of the handle 1 in the manner as is clearly illustrated in Figure 2.

The use of my improved cherry pitter in removing pits from cherries will prevent the fruit from being crushed or otherwise bruised during the removal of the pit therefrom and will thus preserve the fruit in its natural condition for canning purposes.

The simplicity of my device enables the same to be manufactured at a very low cost and will further be strong and durable as well as efficient in its use.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

In combination, a handle circular in cross section and provided with a longitudinally extending surface recess starting at one end, a blade arcuate in cross section and having one end portion disposed in the recess, a ferrule disposed over the portion of the blade in the recess and the adjacent portion of the handle, and a fastening element piercing the ferrule and the blade and extending into the handle.

In testimony whereof I affix my signature.

DAVID B. C. FERGUSON.